(12) United States Patent
Palos et al.

(10) Patent No.: US 10,692,293 B2
(45) Date of Patent: Jun. 23, 2020

(54) LOADING INDICATOR IN AUGMENTED REALITY ENVIRONMENT

(71) Applicant: GOOGLE LLC, Mountain View, CA (US)

(72) Inventors: Xavier Benavides Palos, San Francisco, CA (US); Rebecca Ackermann, San Francisco, CA (US)

(73) Assignee: GOOGLE LLC, Mountain View, CA (US)

(*) Notice: Subject to any disclaimer, the term of this patent is extended or adjusted under 35 U.S.C. 154(b) by 29 days.

(21) Appl. No.: 16/129,090

(22) Filed: Sep. 12, 2018

(65) Prior Publication Data

US 2020/0082627 A1    Mar. 12, 2020

(51) Int. Cl.
*G06T 19/00*    (2011.01)
*G06F 3/0481*   (2013.01)
*G06T 13/20*    (2011.01)

(52) U.S. Cl.
CPC ........ *G06T 19/006* (2013.01); *G06F 3/04817* (2013.01); *G06T 13/20* (2013.01)

(58) Field of Classification Search
CPC .... G06T 19/006; G06T 13/20; G06F 3/04817
See application file for complete search history.

(56) References Cited

U.S. PATENT DOCUMENTS

| | | | |
|---|---|---|---|
| 8,726,182 B1 | 5/2014 | Murphy et al. | |
| 9,519,999 B1* | 12/2016 | Gharpure | G06T 17/00 |
| 2011/0279453 A1* | 11/2011 | Murphy | G06T 13/00 |
| | | | 345/420 |
| 2014/0063058 A1 | 3/2014 | Fialho et al. | |
| 2014/0136313 A1 | 5/2014 | Shaw et al. | |
| 2014/0333667 A1 | 11/2014 | Jung et al. | |
| 2016/0110061 A1* | 4/2016 | Low | G06N 5/02 |
| | | | 715/772 |
| 2017/0236320 A1* | 8/2017 | Gribetz | G06T 19/00 |
| | | | 345/419 |

OTHER PUBLICATIONS

International Search Report and Written Opinion for Application No. PCT/US2019/047236, dated Oct. 17, 2019, 14 pages.
Cao, et al., "How Much Longer to Go? The Influence of Waiting Time and Progress Indicators on Quality of Experience for Mobile Visual Search Applied to Print Media", Fifth International Workshop on Quality of Multimedia Experience 2013, 2013, pp. 112-117.

* cited by examiner

*Primary Examiner* — Chong Wu
(74) *Attorney, Agent, or Firm* — Brake Hughes Bellermann LLP

(57) ABSTRACT

A method includes: presenting, on a device, a view of at least part of an augmented reality (AR) environment, the AR environment including a first AR location corresponding to a first physical location in a physical environment; initiating a download to the device of first data representing a first AR object associated with the first AR location; assigning a size parameter to a first loading indicator for the first AR object based on a size of the first AR object; determining a spatial relationship between the view and the first physical location; and presenting the first loading indicator in the view, the first loading indicator having a size based on the assigned size parameter and being presented at a second AR location based on the determined spatial relationship.

24 Claims, 8 Drawing Sheets

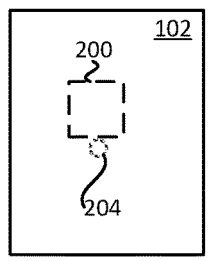
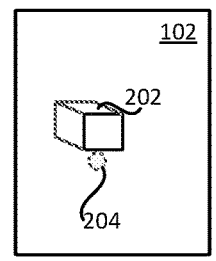
FIG. 2A  FIG. 2B
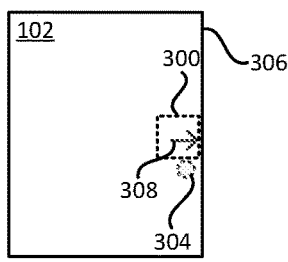
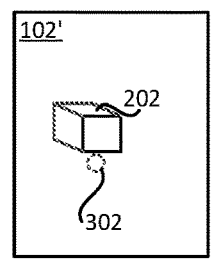
FIG. 3A  FIG. 3B
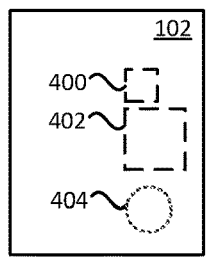
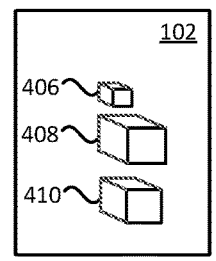
FIG. 4A  FIG. 4B
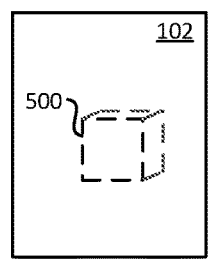
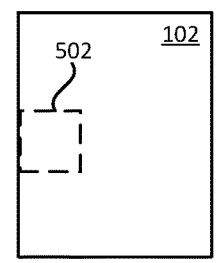
FIG. 5A  FIG. 5B

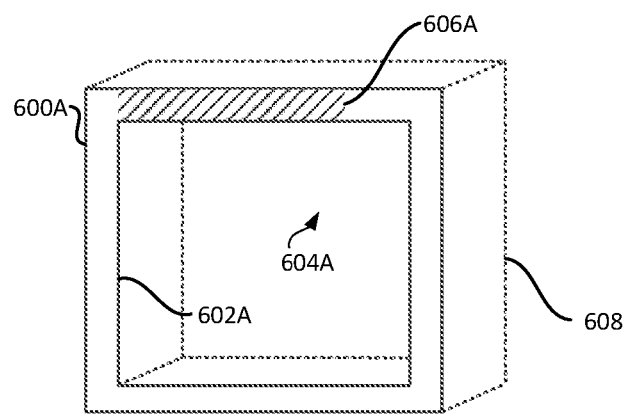
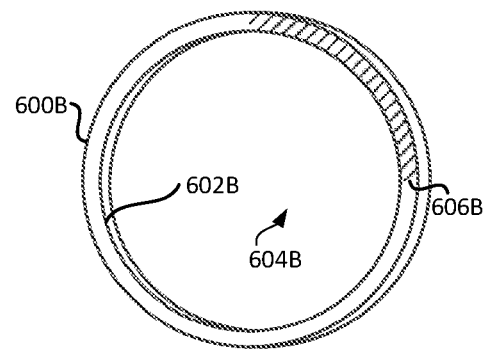
FIG. 6A       FIG. 6B
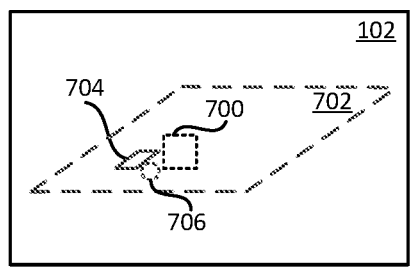
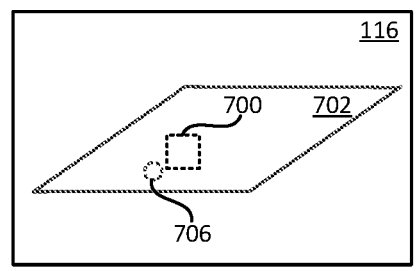
FIG. 7A       FIG. 7B

LOADING INDICATOR IN AUGMENTED REALITY ENVIRONMENT

TECHNICAL FIELD

This document relates, generally, to a loading indicator in an augmented reality environment.

BACKGROUND

A participant can be provided with immersive experiences in relation with computer-based consumption of media and other content. Some such experiences are provided using a device such as a smartphone or a tablet that presents virtual reality (VR) and/or augmented reality (AR) environments. For an immersive experience with regard to an AR environment, a person can watch a screen that presents at least both an aspect of a physical environment (e.g., a video or image of a physical space) and an aspect of VR (e.g., a virtual object superimposed on the video or image).

SUMMARY

In a first aspect, a method includes: presenting, on a device, a view of at least part of an augmented reality (AR) environment, the AR environment including a first AR location corresponding to a first physical location in a physical environment; initiating a download to the device of first data representing a first AR object associated with the first AR location; assigning a size parameter to a first loading indicator for the first AR object based on a size of the first AR object; determining a spatial relationship between the view and the first physical location; and presenting the first loading indicator in the view, the first loading indicator having a size based on the assigned size parameter and being presented at a second AR location based on the determined spatial relationship.

Implementations can include any or all of the following features. The spatial relationship indicates that the first physical location is within the view, and the method further comprises selecting the second AR location for presentation of the first loading indicator to coincide with the first AR location in the view. The spatial relationship indicates that the first physical location is not within the view, the method further comprising selecting the second AR location for presentation of the first loading indicator to be at a side of the view closest to the first AR location. The first loading indicator is smaller than a second loading indicator configured for use when the spatial relationship indicates that the first physical location is within the view. The first loading indicator has a two-dimensional appearance and a second loading indicator has a three-dimensional appearance, the second loading indicator configured for use when the spatial relationship indicates that the first physical location is within the view. The first loading indicator includes an arrow, and the first loading indicator is positioned so that the arrow points toward the first AR location. Size information for a second AR object is not available to the device during downloading of second data representing the second AR object, and the method further comprises presenting a second loading indicator for the second AR object based on the size information not being available, the second loading indicator different from the first loading indicator. A remaining duration of the download of the first data is not available to the device during the download, and the method further comprises activating an indeterminate-duration mode of the first loading indicator based on the remaining duration not being available. The method further comprises subsequently determining the remaining duration of the download of the first data, and activating a determinate-duration mode of the first loading indicator based on determining the remaining duration. The method further comprises determining whether a plane in the AR environment that is associated with the first AR location is known, and if so selecting the second AR location for presentation of the first loading indicator to be at the plane. If the determination reflects that the plane in the AR environment that is associated with the first AR location is not known, the method further comprises selecting the second AR location for presentation of the first loading indicator based on an AR marker in the AR environment. The first data comprises a mesh and a texture configured to be applied to the mesh, the method further comprising determining the size of the first AR object using the mesh. The method further comprises determining a footprint of the first AR object using the mesh, and morphing the first loading indicator into a footprint representation of the first AR object based on the determined footprint. The download of the first data is triggered by a user selection in a presented list of AR objects. The download of the first data is triggered by a location of the device in the physical environment. The download of the first data is triggered by access of a uniform resource locator using the device. The download of the first data comprises a peer-to-peer transmission. The first data is stored on the device after being downloaded, and wherein the first loading indicator indicates a progress of preparing to present the first AR object using the stored first data.

In a second aspect, a non-transitory storage medium has stored thereon instructions that when executed are configured to cause a processor to perform operations, the operations comprising: presenting, on a device, a view of at least part of an augmented reality (AR) environment, the AR environment including a first AR location corresponding to a first physical location in a physical environment; initiating a download to the device of first data representing a first AR object associated with the first AR location; assigning a size parameter to a first loading indicator for the first AR object based on a size of the first AR object; determining a spatial relationship between the view and the first physical location; and presenting the first loading indicator in the view, the first loading indicator having a size based on the assigned size parameter and being presented at a second AR location based on the determined spatial relationship.

Implementations can include any or all of the following features. The first loading indicator comprises a peripheral element having a progress indicator, the peripheral element surrounding a transparent center of the first loading indicator. The operations further comprise determining a status of a download link used for downloading the first data, and assigning a color to the first loading indicator based on the determined status.

In a third aspect, a non-transitory storage medium has stored thereon instructions that when executed are configured to cause a processor to generate a graphical user interface, the graphical user interface comprising: a view including at least part of an augmented reality (AR) environment, the AR environment including a first AR location corresponding to a physical location in a physical environment, wherein an AR object is associated with the first AR location; and a loading indicator for the AR object, the loading indicator having a size based on a size of the AR object and being presented at a second AR location in the view based on a spatial relationship between the view and the physical location.

Implementations can include any or all of the following features. The spatial relationship indicates that the physical location is within the view, and the second AR location is selected for presentation of the loading indicator to coincide with the first AR location in the view. The spatial relationship indicates that the physical location is not within the view, and wherein the second AR location is selected for presentation of the loading indicator to be at a side of the view closest to the first AR location.

BRIEF DESCRIPTION OF DRAWINGS

FIGS. 2A-B show examples of presenting a loading indicator in a view before presenting an AR object.

FIGS. 3A-B show examples of presenting a loading indicator for an AR object being loaded to a location outside a present view.

FIGS. 4A-B show examples of assigning a size parameter to a loading indicator based on a size of an AR object.

FIGS. 5A-B show examples of a loading indicator having a three-dimensional appearance and a loading indicator having a two-dimensional appearance.

FIGS. 6A-B show examples of loading indicators.

FIGS. 7A-B show examples of selecting a location for a loading indicator.

Like reference symbols in the various drawings indicate like elements.

DETAILED DESCRIPTION

Figure 1:
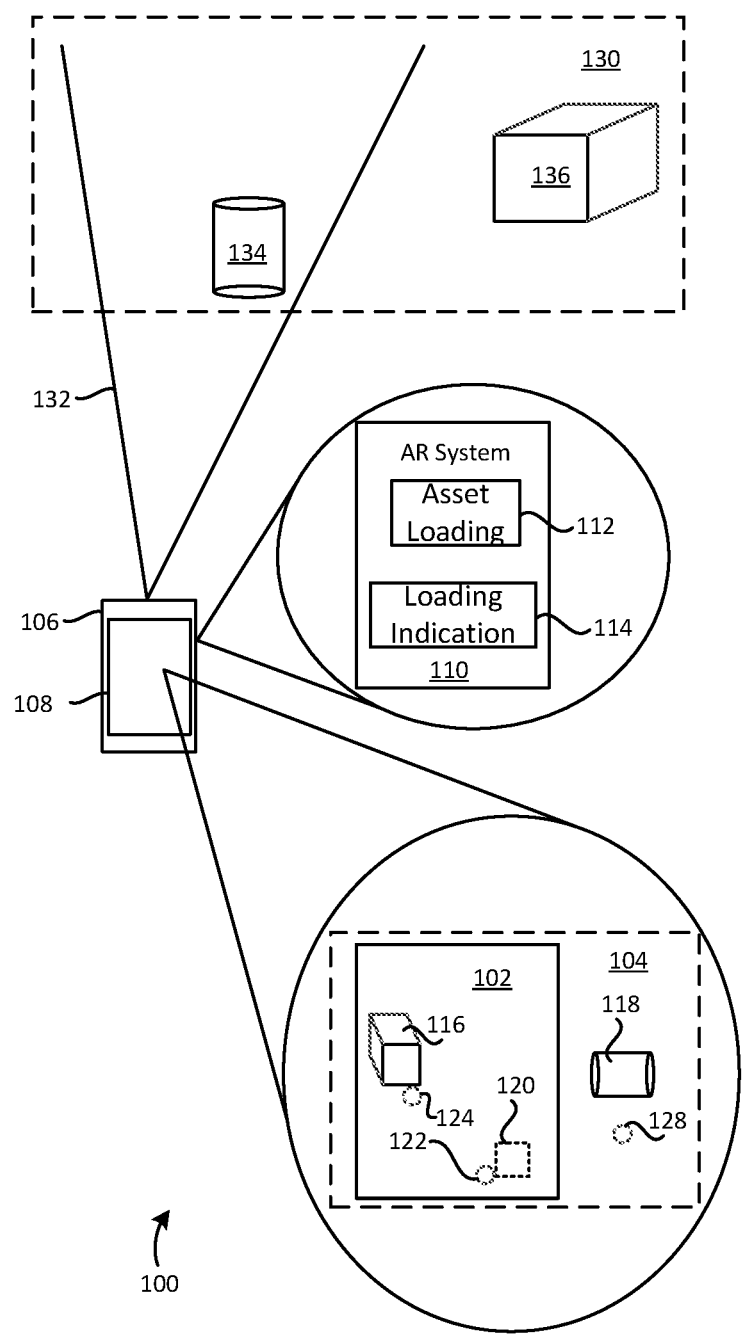
FIG. 1 shows an example of a system that can present a view of an augmented reality (AR) environment.

This document describes examples of presenting a loading indicator in a view of an augmented reality (AR) environment that is provided on a device. The loading indicator can be presented in the view to indicate to a user that an AR object is being downloaded to, and/or rendered on, the device. The loading indicator can signify that the AR object is being downloaded; that the AR object is in the local environment (e.g., on a device) and is currently being loaded for presentation; and/or that the device (e.g., a smartphone) is waiting because one or more other receiver devices is trying to obtain the AR object, to name just a few examples. The loading indicator can have one or more characteristics representing some aspect of the AR object and/or the processing thereof.

Various types of objects can be presented in an AR environment on a device. Some of such objects may have a relatively substantial size as presented in the AR environment. The size referred to is here the size of the object as it appears in the AR environment, and not, say, the size of the file or other data structure that contains the data of the object. For this and/or other reasons, an implementation may be configured to host such objects off the device and download the objects to the device as needed. The download and/or the rendering of a downloaded object can take some amount of time that may be noticeable to the user. For example, the process can take on the order of about a number of seconds. While the user is waiting for the object to appear, some implementations can visually communicate relevant information to the user. For example, the communication can represent the fact that the object is loading, indicate where the object will be, and/or indicate how long the user the user needs to wait. It can be advantageous to communicate such information within the AR environment where the object is intended to appear, in an effort to maintain the user's attention so that the user does not walk away, or look away, from the location where the object is to appear. A loading indicator, including, but not limited to, any of those shown in examples herein, can be presented to communicate such or other information to a user. For example, the loading indicator can indicate how large the object being loaded will be so that the user can position himself or herself correctly in the AR environment.

Presentation of loading indicators can provide any of a number of advantages. The loading indicator can be presented at or near the object's future location in the AR environment to help direct the user's gaze to that location, which can reduce the likelihood that the user misses or ignores the object. If the user is not presently looking toward the object's future location in the AR environment (e.g., as reflected by the particular view of the AR environment that the user chooses to present on the device), a substitute form of loading indicator can be presented that may indicate in which direction the user should turn their gaze (e.g., by changing the view of the AR environment) in order to observe the object. The loading indicator can represent to the user the size of the object that is to appear in the AR environment, for example by modifying the size of the loading indicator corresponding to the object size. This can reduce the chance that the user never notices the AR object, or conversely, can reduce the likelihood that the user is startled by the (sudden) appearance of the object in the AR environment. In some implementations, the shape and/or size of the loading indicator can be adapted based on an aspect of the AR object (e.g., its footprint). For example, when the size of the object being loaded is not available to the device, a loading indicator of a default shape (e.g., circular) can be presented. By contrast, when the size of the object being loaded is or becomes available, a loading indicator having another shape (e.g., square or otherwise rectangular) can be presented. In some implementations, a loading indicator can indicate the wait time to the user. For example, when the wait time for the object being loaded is not available to the device, an indeterminate loading indicator (e.g., an indeterminate animation loop) can be presented. By contrast, when the wait time for the object being loaded is or becomes available, a determinate loading indicator (e.g., communicating a percentage loaded) can be presented. Such functionality can be implemented by way of creating respective indeterminate-duration and determinate-duration modes for a loading indicator. The indication of wait time can help maintain the user's attention and increase the chance that the user will notice the AR object. A loading indicator can be anchored in the AR environment in any of a number of ways. In some implementations, where plane detection is being used to place an object, a loading indicator can be made to appear on the plane in the AR environment where the object will appear. In some implementations, one or more types of markers can be used, for example such that a loading indicator appears on a marker surface in the AR environment. This approach can reduce or eliminate the effort required to find a plane for the anchoring.

AR environments can be presented to a user in any of a number of use case scenarios. In some implementations, an AR system is designed to facilitate education by one or more individuals (sometimes referred to as the "teacher") for the benefit of one or more participants (sometimes referred to as the "students"). In some implementations, the teacher can organize an AR tour that takes place among tables in a classroom. A number of AR entities can be presented (e.g., in respective groupings organized by respective physical markers) in relation to the tables or other structures. The students can then move between the tables to inspect new AR objects or AR environments. The teacher can have stored on a device (e.g., a smartphone, tablet or other mobile device) information that defines the tour as well as the data corresponding to the AR objects that should be presented on the respective devices of the students. To start the tour, the student devices can be coupled to the teacher's device (e.g., by near-field communication or another type of wireless signaling). The teacher's device can send the first AR object to the students' devices. Transmission can be done sequentially, or in a round-robin order, to name just two examples. Subsequent AR objects can then be sent to the students' devices as the tour progresses.

In some implementations, AR objects can be downloaded to and stored on a user device in preparation for a later viewing/interaction session. For example, the user can download an AR tour including the AR objects thereof to the device and can then activate the tour at will. In some implementations, the objects can remain stored on the device for a predetermined time and then automatically be deleted.

Examples described herein refer to AR objects and AR environments. It is contemplated that a mixture of AR and virtual reality (VR) experience can be provided to a user. The implementations described herein can be used within an immersive VR experience (e.g., a VR experience using a head mounted display). A user can experience presentations described herein using any of a number of types of devices or other apparatuses. In some implementations, the user observes an AR environment using a mobile device (e.g., a smartphone or a tablet). In some implementations, the user observes an AR environment using a head-mounted display (e.g., a pair of AR goggles). Examples of system architectures are described below with reference to FIG. 13.

FIG. 1 shows an example of a system 100 that can present a view 102 of an AR environment 104. The system 100 or components thereof can be used with one or more examples described herein. The system 100 includes a device 106 having a display 108. For example, the device 106 can include a mobile device (e.g., smartphone or tablet) or a head-mounted display.

An AR system 110 can be installed on the device 106, or be installed in a separate system (e.g., in the cloud) from which it can provide services to the device 106. In some implementations, the AR system 110 can include software, hardware, or combinations thereof, to facilitate use of the device 106 to present the view 102 to the user and allow the user to interact with the AR environment 104. In facilitating such operations, the AR system 110 can be organized in form of one or more modules corresponding to the respective function(s). In some implementations, the AR system 110 includes an asset loading component 112 and/or a loading indication component 114. For example, the asset loading component 112 can be responsible for downloading data to the device 106 that represents one or more AR objects 116 or 118. For example, the loading indication component 114 can be responsible for indicating to the user that the AR object 116 or 118 is in the process of being loaded for display. Here, a loading indicator 120 corresponding to some object other than the AR objects 116 and 118 is currently being presented at a location 122 within the view 102. The loading indicator 120 and loading indicators in some other examples described herein are illustrated by a dashed outline. For example, the dashed outline can represent any of a number of physical appearances that the loading indicator can have. The loading indicator 120 can indicate to the user that a download to the device 106 of data representing that other AR object has been initiated. The loading indicator 120 can be assigned a size parameter based on a size of the AR object to which the loading indicator 120 corresponds. In some implementations, the size of the loading indicator 120 can be proportional to the size of the AR object. The size of the loading indicator referred to is here the size of the loading indicator as it appears in the AR environment, and not, say, the size of the file or other data structure that contains the data of the loading indicator. For example, the size of the loading indicator 120 can be proportional to the AR object size in a range between maximum and minimum sizes.

In this example, the AR object 116 is being presented at a location 124, and the AR object 118 at a location 128, in the AR environment 104. The locations 124 and 128 in the AR environment 104 can correspond to respective locations in a physical environment, for example as will be described below. Here, the location 124 is within the present scope of the view 102 (i.e., the AR object 116 is currently visible to the user) whereas the location 128 is outside of the view 102 (i.e., the AR object 118 is not currently visible to the user). The location 122 where the loading indicator 120 is presented can be selected based on whether the location of the object to which the loading indicator 120 corresponds is inside or outside of the view 102. The locations 122, 124 and 128 are here schematically illustrated as circles with a dashed outline for clarity purposes; however, they need not themselves be visible in an actual implementation.

The user can observe and interact with the AR environment 104 by way of selecting the view 102 thereof corresponding to what the user is interested in exploring. In some implementations, the user can aim a sensor (e.g., a camera) of the device 106 toward a physical environment 130 to at least in part affect what the AR system 110 should present in the view 102. The physical environment 130 can be any environment within which the device 106 is located or which is perceptible by the device 106. A field-of-view 132 of the device 106 is here schematically indicated with regard to the physical environment 130. For example, the user can aim the field-of-view 132 in any of various directions toward the physical environment 130 to control which aspect(s) of the AR environment 104 should currently be covered by the view 102. The physical environment can include any number of physical objects or other structures. Here, physical objects 134 and 136 are shown. Locations within the physical environment 130 can correspond to locations (e.g., the locations 124 or 128) within the AR environment 104.

The system 100 illustrates an example of a method that includes presenting, on a device (e.g., the device 106), a view (e.g., the view 102) of at least part of an AR environment (e.g., the AR environment 104). The AR environment includes a first AR location (e.g., the location 122) corresponding to a first physical location in a physical environment (e.g., the physical environment 130). The method includes initiating a download to the device of data representing an AR object associated with the first AR location. The method includes assigning a size parameter to a loading indicator (e.g., the loading indicator 120) for the AR object based on a size of the AR object. The method includes determining a spatial relationship between the view and the physical location (e.g., whether the first AR location in the AR environment 104 that corresponds to the physical location is within the view 102). The method includes presenting the loading indicator in the view, the loading indicator having a size based on the assigned size parameter and being presented at a second AR location based on the determined spatial relationship. The second AR location can be the same as, or different from, the first AR location. For example, the second AR location can be selected to coincide with the first AR location in the view.

FIGS. 2A-B show examples of presenting a loading indicator 200 in the view 102 before presenting an AR object 202. The loading indicator 200 can be used with any or all of the examples described herein. A location 204 is also indicated in the view 102. The loading indicator 200 is placed at the location 204. In some implementations, when a system (e.g., the AR system 110 in FIG. 1) that generates the view 102 initiates a download of the AR object 202, the system can present the loading indicator 200 to the user as a form of placeholder before the AR object 202 becomes visible. The loading indicator 200 can be assigned a size parameter based on a size of the AR object 202. The size parameter can control, but is not limited to controlling, size, width, length, and/or depth of the loading indicator 200. For example, the larger the AR object 202 will be, the larger the loading indicator 200 can be, to give the user a realistic expectation. FIG. 2B shows that the AR object 202 is to be placed at the location 204, which can correspond to a particular physical location in a physical environment in which the user is present. Moreover, FIG. 2A shows that the location 204 is within the view 102 during the download. The appearance of the loading indicator 200 can be selected based on this spatial relationship. For example, the loading indicator 200 can be placed at the location 204 where the AR object 202 is to be presented. In some implementations, the spatial relationship includes a binary indicator corresponding to whether the location 204 is within the view 102. In some implementations, the spatial relationship can reflect coordinates (e.g., x,y,z) within the view corresponding to the location 204.

In the above example, the loading indicator 200 appears during a download of the data for the AR object 202. In some implementations, the data for the AR object 202 may already be stored on the device that generates the view 102, but the AR object 202 may not yet have been rendered in the view 102. For example, the loading indicator 200 can then be presented during the time it may take to process the data before the AR object 202 is rendered in the view 102. Such loading and/or unloading of AR objects can occur in a variety of contexts. For example, the user may have access to multiple AR objects stored locally on the device, and the device may switch between two or more of such AR objects (e.g., by input from the user or by another signal) to alternate between which one(s) of the AR objects the device presents at any given time. Accordingly, the loading indicator 200 can then be used to keep the user informed as to the future locations and approximate size of the next AR object(s), and in so doing, indicate to the user a progress of preparing the next AR object(s) for presentation.

FIGS. 3A-B show examples of presenting a loading indicator 300 for the AR object 202 being loaded to a location 302 outside a present view. The loading indicator 300 can be used with any or all of the examples described herein. FIG. 3A shows that the present view is the view 102. In FIG. 3B, however, where the AR object 202 is to appear at the location 302, the present view is instead a view 102' which is at least partially different from the view 102. Namely, in the view 102, the location 302 is not visible because the location 302 is not within the view 102. The loading indicator 300 is therefore placed at a location 304 within the view 102. The location 304 can be any predefined location within the view 102. In some implementations, the location 304 is chosen to be at or near a side 306 (e.g., a right side) of the view 102 that is closer to the location 302 than what other sides (e.g., left, top and bottom sides of the view 102) are. For example, when the view 102 is visible on the device, the user can pan the device to the right to instead observe the view 102'. That is, when the view 102 is visible, the side 306 is closest to the location 302 which is within the view 102'. As such, the loading indicator 300 can be used for indicating at the user that the AR object 202 is currently being loaded for presentation; not within the view 102 which is currently visible, but in the view 102'.

The loading indicator 300, which represents loading of the AR object 202 outside of the presently visible view, can be distinguished from the loading indicator 200 (FIG. 2A) in one or more ways. In some implementations, the loading indicator 300 is smaller than the loading indicator 200 (FIG. 2A). For example, the smaller size can be used to avoid blocking content in the view 102 while at the same time allowing the user to recognize that loading of something that may be of interest is occurring in the view 102'. In some implementations, the loading indicator 300 is or has an indicator 308. For example, the indicator 308 can be an arrow pointing in the direction of the location 302.

FIGS. 4A-B show examples of assigning a size parameter to a loading indicator based on a size of an AR object. These examples involve loading indicators 400, 402 and 404 in the view 102, which represent AR objects 406, 408 and 410, respectively. The loading indicators 400, 402 and 404 and/or the AR objects 406, 408 and 410 can be used with any or all of the examples described herein.

In this example, the loading of the AR objects 406, 408 and 410 can occur concurrently or in any order. In response to the beginning of the loading of the AR object 406, its size that it will have when appearing in the AR environment can be determined. Based on the determined size, a size parameter can be assigned to the loading indicator 400. In this example, the AR object 406 is a rectangular box having a certain size in the view 102. For example, the loading indicator 400 can be assigned its size based on the size of the AR object 406. In some implementations, it is the spatial size of the AR object 406 that is the basis for the size parameter and not, say, another size-related characteristic such as the size of the file that contains the data that will be used for rendering the AR object 406. A size parameter can correspond to one or more size-related characteristics, including, but not limited to, height, width, depth, length, and/or circumference.

In response to the beginning of the loading of the AR object 408, its size can be determined, and a size parameter can be assigned to the loading indicator 402 based on the determined size. In this example, the size of the AR object 408 is larger than that of the AR object 406. The larger size can cause a greater size parameter to be assigned to the loading indicator 402 than to the loading indicator 400. For example, this can make the loading indicator 402 larger than the loading indicator 400 in the view 102.

In some implementations, size information for an AR object may not be available as it is being loaded. Here, for example, size information for the AR object 410 is not available during the loading process. In response to the beginning of the loading of the AR object 410, a predefined shape can be assigned to the loading indicator 404 based on the size information not being available. In this example, the loading indicator 404 is assigned a circular shape. The circle can distinguish the loading indicator 404 as being of a different type than, say, the loading indicators 400 or 402. For example, the loading indicators 400 or 402 can have a square or otherwise rectangular shape. Accordingly, the loading indicator 404 can convey to the user that the AR object 410 is being loaded, while its circular shape can indicate that the size of the loading indicator 404 does not necessarily reflect the size that the AR object 410 will have.

FIGS. 5A-B show examples of a loading indicator 500 having a three-dimensional appearance and a loading indicator 502 having a two-dimensional appearance. The loading indicators 500 or 502 can be used with any or all of the examples described herein. The loading indicator 500 in the view 102 is here illustrated as a square or otherwise rectangular box drawn with a dashed outline. For example, the dashed outline can represent any of a number of three-dimensional physical appearances that the loading indicator can have.

A dimensionality of a loading indicator can relate to one or more characteristics. In some implementations, the number of dimensions of the loading indicator can correspond to whether the loading indicator marks the location where the AR object will appear, or another location. For example, the loading indicator 500 having the three-dimensional appearance can be used at the location 204 (FIG. 2A), because that location is where the AR object 202 (FIG. 2B) is to appear. For example, the loading indicator 502 having the two-dimensional appearance can be used at the location 304 in the view 102 (FIG. 3A), because that location is near the side 306 that is closer to the view 102' (FIG. 3B) which contains the location 302 where the AR object 202 is to appear.

A loading indicator can transform into any other loading indicator based on the surrounding circumstances. In some implementations, the loading indicator 500 having the three-dimensional appearance can be presented while the view containing that location is visible, and can morph or otherwise transform into the loading indicator 502 having the two-dimensional appearance upon the view being changed so that the location of the AR object is no longer visible. Similarly, the loading indicator 502 having the two-dimensional appearance can morph or otherwise transform into the loading indicator 500 having the three-dimensional appearance.

FIGS. 6A-B show examples of loading indicators 600A and 600 B. The loading indicators 600A or 600B can be used with any or all of the examples described herein. The loading indicator 600A includes a peripheral element 602A. The peripheral element 602A is a square or otherwise rectangular border. For example, the peripheral element 602A can be generated by rendering a smaller frame inside a larger frame. In the loading indicator 600A, the peripheral element 602A forms a transparent center 604A. For example, the peripheral element 602A forms a periphery that defines the transparent center 604A; that is, the transparent center 604A is here surrounded by the peripheral element 602A. The transparent center 604A allows the user to see through the loading indicator 600A. The loading indicator 600A has a progress indicator 606A that indicates a remaining time until the corresponding AR object is rendered and will be visible to the user. The progress indicator 606A can include shading (here schematically represented by cross-hatching) that gradually extends along the peripheral element 602A. For example, the shading can progress in a clockwise fashion. The peripheral element 602A of the loading indicator 600A is here illustrated using solid lines. A three-dimensional element 608, on the other hand, is illustrated using dashed lines to indicate that it is an optional feature. That is, the loading indicator 600A can have a two-dimensional appearance or a three-dimensional appearance.

The loading indicator 600B includes a peripheral element 602B. The peripheral element 602B is a circular or elliptical border. For example, the peripheral element 602B can be generated by rendering a smaller circle/ellipse inside a larger circle/ellipse. In the loading indicator 600B, the peripheral element 602B forms a transparent center 604B. For example, the peripheral element 602B forms a periphery that defines the transparent center 604B; that is, the transparent center 604B is here surrounded by the peripheral element 602B. The transparent center 604B allows the user to see through the loading indicator 600B. The loading indicator 600B has a progress indicator 606B that indicates a remaining time until the corresponding AR object is rendered and will be visible to the user. The progress indicator 606B can include shading (here schematically represented by cross-hatching) that gradually extends along the peripheral element 602B. For example, the shading can progress in a clockwise fashion. The peripheral element 602B of the loading indicator 600B is here illustrated using solid lines to indicate that it has a three-dimensional appearance. In other examples, the loading indicator 600B can have a two-dimensional appearance.

The loading indicator 600A and/or 600B can operate in any of multiple modes. In some implementations, the loading indicator 600A and/or 600B can operate in an indeterminate-duration mode. For example, this can be activated when a remaining duration of the download of the data for the AR object is not available to the device during the download and the loading indicator 600A and/or 600B can then be controlled to run for an indeterminate time. In some implementations, the loading indicator 600A and/or 600B can operate in a determinate-duration mode. For example, this can be activated when a remaining duration of the download of the data for the AR object is available to the device during the download, and the loading indicator 600A and/or 600B can then be controlled to run for that remaining time. Transitions between an indeterminate-duration mode and a determinate-duration mode can be done. For example, if the loading indicator is activated in the indeterminate-duration mode and the device subsequently determines the remaining duration of the download of the data, the determinate-duration mode for the loading indicator can be activated.

Examples above described use of shading in the peripheral element 602A or 602B in the context of indicating progress. Shading can also or instead be used for one or more other purposes. In some implementations, the health or other status of the download link that is being used for obtaining the AR object can be determined, and a shading parameter of the loading indicator can be updated to reflect the determined health/status. For example, if the download link is determined to be slower than some standard or nominal value, then the shading of the loading indicator can be updated (e.g., to a red color).

Loading indicators in described examples are visual elements that symbolically (e.g., by their shape and/or size) or spatially (e.g., by their position) convey one or more messages to the user. Messages can also or instead be conveyed in another way. In some implementations, a loading indicator (e.g., the loading indicator 600A in FIG. 6A) can also be provided with text content. For example, the text content can convey that AR object is being loaded and/or when the AR object will be ready to render.

FIGS. 7A-B show examples of selecting a location for a loading indicator 700. The loading indicator 700 can be used with any or all of the examples described herein. The view 102 in this example contains a plane 702 and a marker 704. The plane 702 can be a VR feature—that is, not a feature in the corresponding physical environment—that has been defined in the AR system that generates the view 102. The marker 704 can be a physical object (e.g., a panel with a QR code) that has been placed at a location 706 in the physical environment to serve as the location definition for an AR object. As another example, the marker 704 can be a pattern that already exists on some structure or other surface in the physical environment and that has been defined (e.g., by capturing an image of the pattern in the AR system) to constitute a marker that can be recognized by one or more AR-enabled devices. The marker 704 and the loading indicator 700 can be concurrently visible in the view 102.

To place the loading indicator 700 in the view 102, an anchor point should be defined or identified. In some implementations, the AR system can analyze the view 102 to identify the plane 702. That is, the determination can reveal that within the view 102 that is currently active for the AR environment, the plane 702 exists and would be available to use as an anchor point. For example, the plane 702 may exist at least partially for the purpose of serving as the place in the view 102 where to place the AR object when it is loaded for presentation. This determination can require a significant amount of processing depending on the scope of the view 102 and the overall size and complexity of the AR environment. If the determination is performed and indicates that the plane 702 is known, then the plane 702 can be used as the anchor point for the loading indicator 700 as shown in FIG. 7B. For example, the location 706 can then be selected as being at least one of the points included in the plane 702. The marker 704 (FIG. 7A) need not exist or be recognized in such a situation.

On the other hand, if the determination is not performed, or if the determination indicates that no plane exists within the view 102, then another approach for anchoring the loading indicator 700 can be used. In some implementations, the marker 704 can be used as the anchor point as indicated in FIG. 7A. For example, the location 706 can be selected for presentation of the loading indicator 700 based on the marker 704 being present in the view 102. This approach can remove the effort and time required for the system to find a plane for the anchoring.

Figure 8:
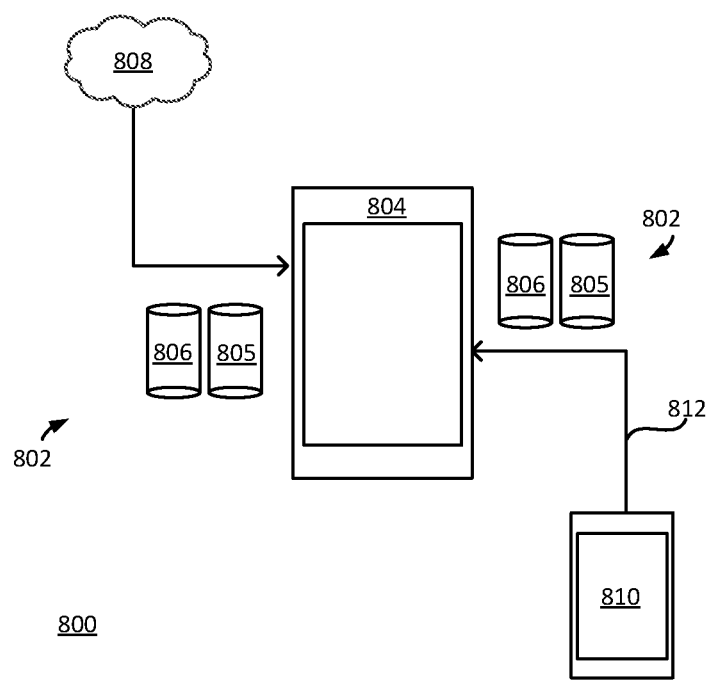
FIG. 8 shows an example of a system that illustrates downloading of data representing an AR object to a device.

FIG. 8 shows an example of a system 800 that illustrates downloading of data 802 representing an AR object to a device 804. The system 800 and functionality described with reference thereto can be used with any or all of the examples described herein. The data 802 can include more than one component that collectively define the AR object (e.g., the AR object 116 or 118 in FIG. 1) that is to be presented on the device 804. In some implementations, the data 802 includes a mesh 805 and texture 806. The mesh 805 can define a raw structure of the AR object including, among other features, the footprint of the AR object. For example, the mesh can include polygonal geometry of the AR object. The texture 806 can represent the surface appearance of the AR object and can define shading parameters such as surface details, color and/or brightness for the appearance of the AR object. The texture 806 can be mapped to the mesh 805 to facilitate presentation (e.g., rendering) of the AR object. Each of the mesh 805 and the texture 806 is a collection of data in some suitable form. Here, the mesh 805 and the texture 806 are illustrated as data containers (e.g., files).

The mesh 805 and the texture 806 can be provided to the device 804 from one or more locations. In some implementations, the mesh 805 and the texture 806 are provided from a cloud 808. In some implementations, the mesh 805 and the texture 806 are provided from a device 810. For example, a peer-to-peer transmission 812 of the mesh 805 and the texture 806 can be performed from the device 810 to the device 804 (or vice versa).

The mesh 805 and the texture 806 may be of significantly different size. For example, the mesh 805 may be a relatively smaller file (e.g., on the order of kilobytes) whereas the texture 806 may be a relatively larger file (e.g., one or more orders of magnitude larger than the mesh 805.) For this or other reasons, the mesh 805 and the texture 806 may not arrive at the device 804 at the same time. This situation can occur whether the data 802 is being pushed to the device 804 by a system or whether the device 804 is pulling the data from a system. For example, the mesh 805 may arrive earlier (e.g., by one or more seconds) than the texture 806. The AR system can determine the size of the AR object using the mesh 805 without necessarily having access to the texture 806. The AR system can determine of or more size-related characteristics regarding the AR object from the mesh 805. For example, the AR system can determine a height, width, depth, length, and/or circumference relating to the AR object based on geometry included in the mesh 805. Based on the determination, the AR system can assign a size parameter to the loading indicator, for example as described in other examples herein.

Figure 9A:
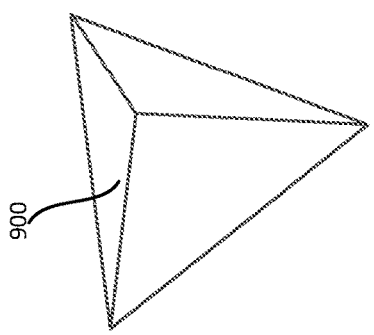
FIGS. 9A-C show an example of a loading indicator morphed into a footprint representation of an AR object.
Figure 9B:
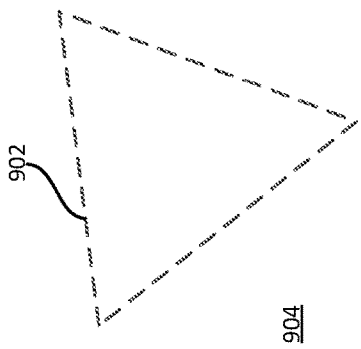
Figure 9C:
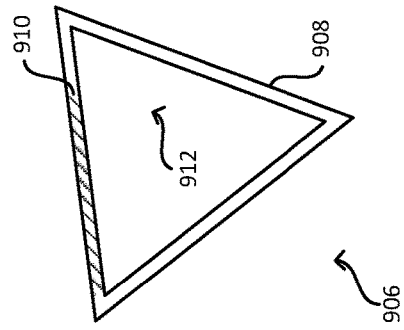

FIGS. 9A-C show an example of a loading indicator morphed into a footprint representation of an AR object 900. The loading indicator can be used with any or all of the examples described herein. FIG. 9A shows the AR object 900 as it will appear when loading is complete and the device renders the image. The AR object 900 can have any shape and in this example is shaped like a triangular pyramid or a tetrahedron, which in FIG. 9A is shown from above. The AR system can determine a footprint 902 of the AR object 900 as shown in FIG. 9B. The footprint 902 is illustrated using a dashed outline to indicate that the footprint 902 is not necessarily a shape or structure that will be visible in the view of the AR environment; rather, the footprint 902 can be defined as the projection onto a plane 904 (e.g., the plane 702 in FIG. 7A) around the periphery of the AR object 900. The AR system can determine the footprint 902 using a mesh (e.g., the mesh 805 in FIG. 8). For example, the AR system can use polygonal geometry of the mesh to determine the peripheral projection onto the plane 904. As another example, the mesh may contain a particular geometric segment defined as the footprint 902 and the AR system can read that information from the mesh. The loading indicator (e.g., the loading indicator 120 in FIG. 1) can be morphed into a footprint representation 906 shown in FIG. 9C based on the determined footprint 902. The footprint representation 906 has the shape of the footprint 902 and can indicate to the user that the AR object 900 is being loaded, and also indicate its approximate appearance by way of being morphed. The footprint representation 906 can indicate a progress of the loading. For example, the footprint representation 906 can include a peripheral element 908, a progress indicator 910, and/or a transparent center 912.

Figure 10A:
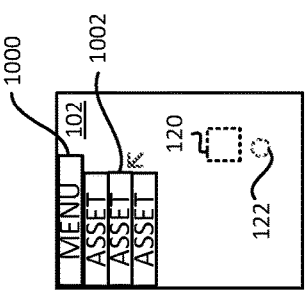
FIGS. 10-C show examples of triggering of a download of data representing an AR object to a device.

FIGS. 10-C show examples of triggering of a download of data representing an AR object to a device. The described techniques can be used with any or all of the examples described herein. FIG. 10A shows that the device can present, such as within the view 102, a menu 1000 that makes one or more assets 1002 available to and selectable by the user in a presented list. For example, each of the assets 1002 in the list can correspond to a respective AR object that the user may wish to download to the device for presentation in the view 102. In response to user selection any of the assets 1002, as schematically illustrated by an arrow controlled by an input device, the AR system can be triggered to begin downloading the data corresponding to the respective AR object. The loading indicator 120 can be presented at the location 122 in the view 102, for example as described in other examples herein.

Figure 10B:
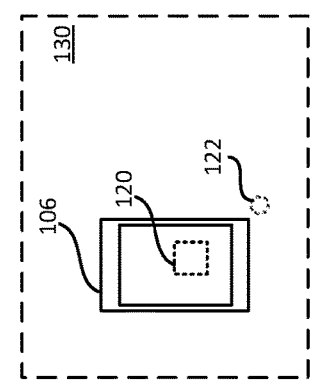

FIG. 10B shows that the device 106 is located within the physical environment 130. The location 122 can be defined as a particular location (e.g., using latitude and longitude or any other geospatial coordinates) in the physical environment 130. For example, a global positioning system (GPS) receiver or another form of wireless position detection can be used for determining that the device currently is at the location 122. The AR system can trigger one or more operations based on the determined location. For example, the download of data for presenting the AR object can be triggered by the determination that the device 106 is at the location 122.

Figure 10C:
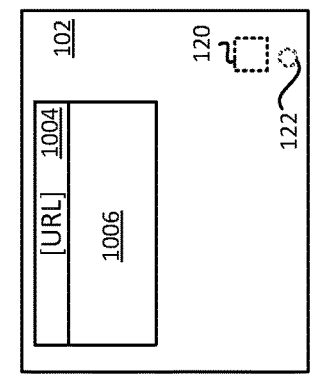

FIG. 10C shows that the device can present, such as within the view 102, a browser 1004 configured for making content 1006 (e.g., a page) available to the user. For example, a respective AR object can be associated with a particular uniform resource locator (URL) which can be entered in the browser 1004. In response to the particular URL being accessed, the AR system can be triggered to begin downloading to the device the data corresponding to the respective AR object. The loading indicator 120 can be presented at the location 122 according to such loading of data.

Figure 11:
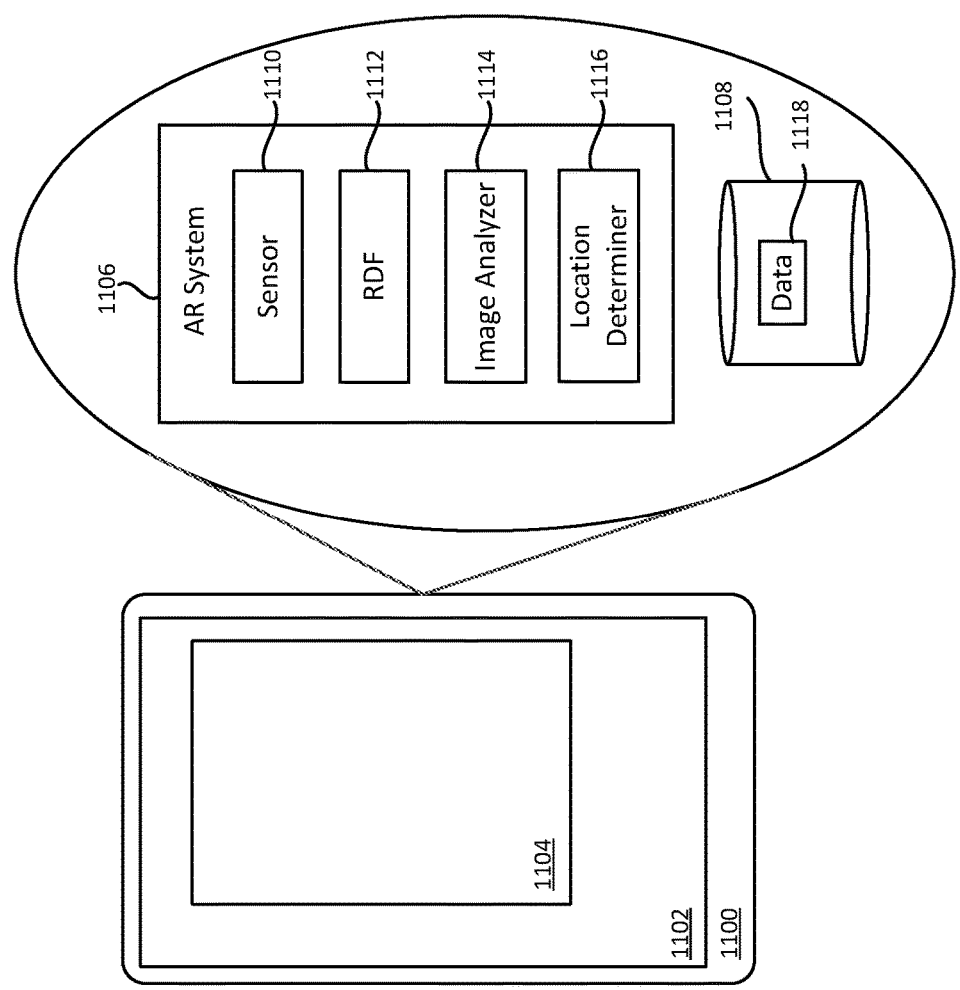
FIG. 11 shows an example of a system that can present an AR environment.

FIG. 11 shows an example of a system 1100 that can present an AR environment. The system 1100 can be used with any or all of the examples described herein. In some implementations, the system 1100 can be implemented in form of a device, including, but not limited to, a smartphone, tablet and/or a head-mounted display. The system 1100 can have at least one display 1102 on which a view 1104 of an AR environment can be presented. An AR system 1106 can be installed in, or otherwise provide services for, the system 1100, and can make use of storage 1108. The AR system 1106 can include at least one sensor 1110. For example, the sensor 1110 can include a camera or other image sensor that captures images of a physical environment, which images the AR system 1106 can use in generating the view 1104 of the AR environment.

The AR system 1106 can include a relative description file (RDF) 1112. The RDF 1112 can define relative positions between a particular set of physical markers (e.g., the marker 704 in FIG. 7A) that have been placed at respective locations. Such an RDF can be shared with multiple devices to facilitate making a predefined AR presentation to the users of the devices. A device having the RDF 1112 can localize its own position by recognizing one of the physical markers (e.g., using a the sensor 1110) to extrapolate the device position and orientation, and can use the RDF 1112 to learn, and act based on, the locations and identities of the other physical markers, also when these markers are not currently visible or directly detectable by the device.

The AR system 1106 can include an image analyzer 1114 that can analyze an image captured by the sensor 1110. In some implementations, the image analyzer 1114 can be used in generating a view of an AR environment. For example, the image analyzer 1114 can seek to detect objects or other structures in a physical environment, which detection can serve as a basis for configuring the AR environment.

The AR system 1106 can include a location determiner 1116. In some implementations, the location determiner 1116 can operate to determine the location of the system 1100 in a physical environment, including, but not limited to, by way of using a GPS receiver or another form of wireless signaling. For example, the location determination can be the basis for triggering a download of particular data to the system 1100.

The AR system 1106 can download data 1118 to the system 1100 for the AR environment. For example, the data 1118 can correspond to an AR object and can include a mesh and a texture.

Figure 12:
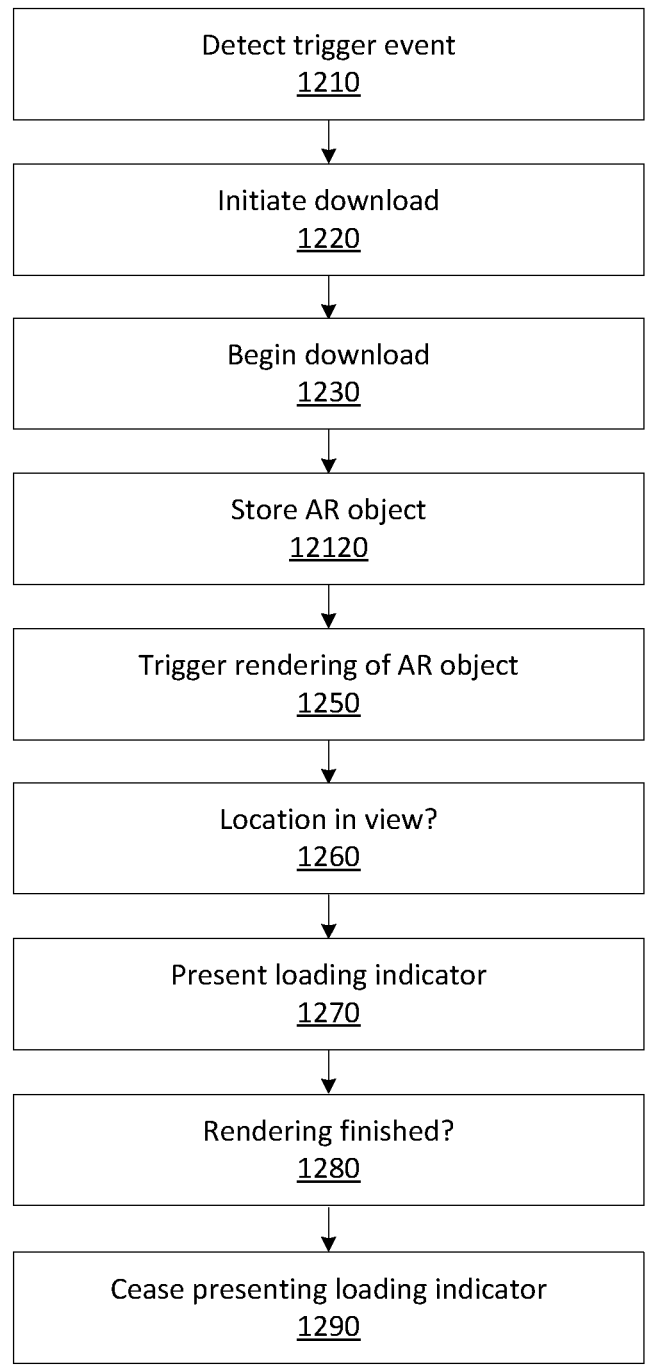
FIG. 12 shows an example of a process relating to a loading indicator.

FIG. 12 shows an example of a process 1200 relating to a loading indicator. The process 1200 can be performed by execution of instructions stored in a non-transitory computer readable storage medium, including, but not limited to, according to one or more examples described with reference to FIG. 13. Two or more of the operations in the process 1200 can be performed in a different order. More or fewer operations than shown here can be performed. Two or more operations in the process 1200 can be performed concurrently with each other. The operations of the process 1200 can be used with any or all of the examples described herein.

At 1210, a trigger event can be detected. For example, the download from the cloud 808 (FIG. 8) can be triggered. For example, the peer-to-peer transmission 812 (FIG. 8) can be triggered. For example, the peer-to-peer transmission 812 (FIG. 8) can be triggered. For example, user selection of the asset 1002 (FIG. 10A) can be performed. For example, location determination of the device 106 (FIG. 10B) can occur. For example, access of the URL in the browser 1004 (FIG. 10C) can occur.

At 1220, a download of data to the device can be initiated based on the trigger event at 1210. For example, the cloud 808 (FIG. 8) or the device 810 can initiate download of the data 802.

At 1230, the download can begin. For example, the download to the device 804 (FIG. 8) from the cloud 808 and/or the device 810 can begin.

At 1240, the data representing the AR object can be stored on the device. For example, the AR system 1106 (FIG. 11) can store the data 1118 in the storage 1108.

At 1250, rendering of the AR object can be triggered. For example, rendering of the AR object 116 or 118 (FIG. 1) can be triggered.

At 1260, it can be determined whether the location where the AR object is to appear is within a presently active view of the AR environment. For example, the AR system 110 (FIG. 1) can determine that the location 122 is within the view 102.

At 1270, a loading indicator can be presented in the view. For example, the loading indicator 200 (FIG. 2A) can be presented when the location 204 is within the view 102. For example, the loading indicator 300 (FIG. 3A) can be presented when the location 302 (FIG. 3B) is not within the view 102. The loading indicator can be presented (at 1270) while the data is being downloaded (at 1230), and/or after rendering has been triggered (at 1250), such as when the data had already been downloaded to the device at an earlier time.

At 1280, it can be determined whether the rendering of the AR object has been finished.

At 1290, presentation of the loading indicator can cease based on the rendering having creased (at 1280).

Figure 13:
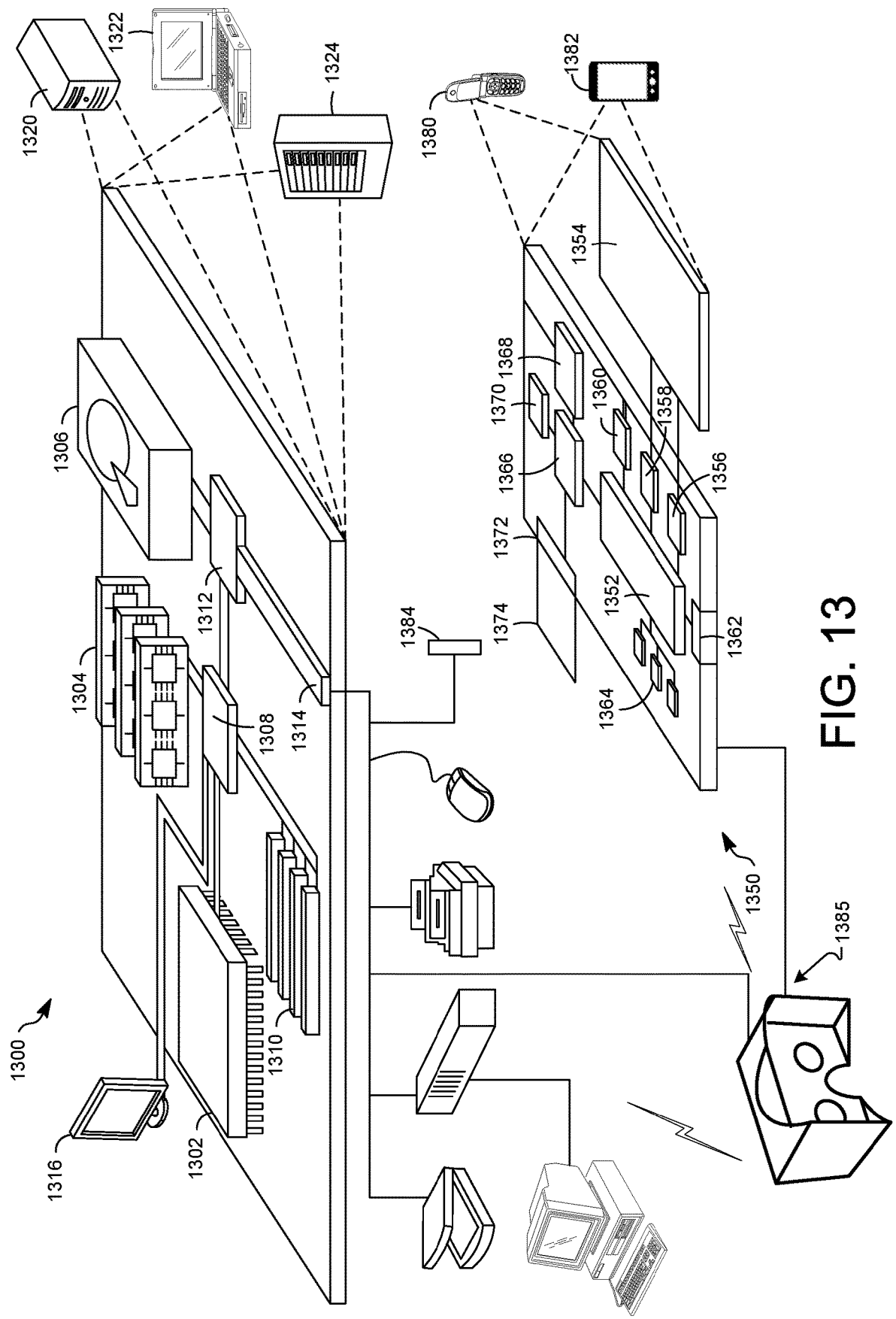
FIG. 13 shows an example of a computer device and a mobile computer device consistent with disclosed embodiments.

FIG. 13 shows an example of a computer device and a mobile computer device that can be used to implement the techniques described here. FIG. 13 shows an example of a generic computer device 1300 and a generic mobile computer device 1350, which may be used with the techniques described here. Computing device 1300 is intended to represent various forms of digital computers, such as laptops, desktops, tablets, workstations, personal digital assistants, televisions, servers, blade servers, mainframes, and other appropriate computing devices. Computing device 1350 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1300 includes a processor 1302, memory 1304, a storage device 1306, a high-speed interface 1308 connecting to memory 1304 and high-speed expansion ports 1310, and a low speed interface 1312 connecting to low speed bus 1314 and storage device 1306. The processor 1302 can be a semiconductor-based processor. The memory 1304 can be a semiconductor-based memory. Each of the components 1302, 1304, 1306, 1308, 1310, and 1312, are interconnected using various busses, and may be mounted on a common motherboard or in other manners as appropriate. The processor 1302 can process instructions for execution within the computing device 1300, including instructions stored in the memory 1304 or on the storage device 1306 to display graphical information for a GUI on an external input/output device, such as display 1316 coupled to high speed interface 1308. In other implementations, multiple processors and/or multiple buses may be used, as appropriate, along with multiple memories and types of memory. Also, multiple computing devices 1300 may be connected, with each device providing portions of the necessary operations (e.g., as a server bank, a group of blade servers, or a multi-processor system).

The memory 1304 stores information within the computing device 1300. In one implementation, the memory 1304 is a volatile memory unit or units. In another implementation, the memory 1304 is a non-volatile memory unit or units. The memory 1304 may also be another form of computer-readable medium, such as a magnetic or optical disk.

The storage device 1306 is capable of providing mass storage for the computing device 1300. In one implementation, the storage device 1306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1304, the storage device 1306, or memory on processor 1302.

The high speed controller 1308 manages bandwidth-intensive operations for the computing device 1300, while the low speed controller 1312 manages lower bandwidth-intensive operations. Such allocation of functions is exemplary only. In one implementation, the high-speed controller 1308 is coupled to memory 1304, display 1316 (e.g., through a graphics processor or accelerator), and to high-speed expansion ports 1310, which may accept various expansion cards (not shown). In the implementation, low-speed controller 1312 is coupled to storage device 1306 and low-speed expansion port 1314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1300 may be implemented in a number of different forms, as shown in the figure. For example, it may be implemented as a standard server 1320, or multiple times in a group of such servers. It may also be implemented as part of a rack server system 1324. In addition, it may be implemented in a personal computer such as a laptop computer 1322. Alternatively, components from computing device 1300 may be combined with other components in a mobile device (not shown), such as device 1350. Each of such devices may contain one or more of computing device 1300, 1350, and an entire system may be made up of multiple computing devices 1300, 1350 communicating with each other.

Computing device 1350 includes a processor 1352, memory 1364, an input/output device such as a display 1354, a communication interface 1366, and a transceiver 1368, among other components. The device 1350 may also be provided with a storage device, such as a microdrive or other device, to provide additional storage. Each of the components 1350, 1352, 1364, 1354, 1366, and 1368, are interconnected using various buses, and several of the components may be mounted on a common motherboard or in other manners as appropriate.

The processor 1352 can execute instructions within the computing device 1350, including instructions stored in the memory 1364. The processor may be implemented as a chipset of chips that include separate and multiple analog and digital processors. The processor may provide, for example, for coordination of the other components of the device 1350, such as control of user interfaces, applications run by device 1350, and wireless communication by device 1350.

Processor 1352 may communicate with a user through control interface 1358 and display interface 1356 coupled to a display 1354. The display 1354 may be, for example, a TFT LCD (Thin-Film-Transistor Liquid Crystal Display) or an OLED (Organic Light Emitting Diode) display, or other appropriate display technology. The display interface 1356 may comprise appropriate circuitry for driving the display 1354 to present graphical and other information to a user. The control interface 1358 may receive commands from a user and convert them for submission to the processor 1352. In addition, an external interface 1362 may be provide in communication with processor 1352, so as to enable near area communication of device 1350 with other devices. External interface 1362 may provide, for example, for wired communication in some implementations, or for wireless communication in other implementations, and multiple interfaces may also be used.

The memory 1364 stores information within the computing device 1350. The memory 1364 can be implemented as one or more of a computer-readable medium or media, a volatile memory unit or units, or a non-volatile memory unit or units. Expansion memory 1374 may also be provided and connected to device 1350 through expansion interface 1372, which may include, for example, a SIMM (Single In Line Memory Module) card interface. Such expansion memory 1374 may provide extra storage space for device 1350, or may also store applications or other information for device 1350. Specifically, expansion memory 1374 may include instructions to carry out or supplement the processes described above, and may include secure information also. Thus, for example, expansion memory 1374 may be provide as a security module for device 1350, and may be programmed with instructions that permit secure use of device 1350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1364, expansion memory 1374, or memory on processor 1352, that may be received, for example, over transceiver 1368 or external interface 1362.

Device 1350 may communicate wirelessly through communication interface 1366, which may include digital signal processing circuitry where necessary. Communication interface 1366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1368. In addition, short-range communication may occur, such as using a Bluetooth, WiFi, or other such transceiver (not shown). In addition, GPS (Global Positioning System) receiver module 1370 may provide additional navigation- and location-related wireless data to device 1350, which may be used as appropriate by applications running on device 1350.

Device 1350 may also communicate audibly using audio codec 1360, which may receive spoken information from a user and convert it to usable digital information. Audio codec 1360 may likewise generate audible sound for a user, such as through a speaker, e.g., in a handset of device 1350. Such sound may include sound from voice telephone calls, may include recorded sound (e.g., voice messages, music files, etc.) and may also include sound generated by applications operating on device 1350.

The computing device 1350 may be implemented in a number of different forms, as shown in the figure. For example, it may be implemented as a cellular telephone 1380. It may also be implemented as part of a smart phone 1382, personal digital assistant, or other similar mobile device.

A user can interact with a computing device using a tracked controller 1384. In some implementations, the controller 1384 can track the movement of a user's body, such as of the hand, foot, head and/or torso, and generate input corresponding to the tracked motion. The input can correspond to the movement in one or more dimensions of motion, such as in three dimensions. For example, the tracked controller can be a physical controller for a VR application, the physical controller associated with one or more virtual controllers in the VR application. As another example, the controller 1384 can include a data glove.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 13 can include sensors that interface with a virtual reality (VR headset 1385). For example, one or more sensors included on a computing device 1350 or other computing device depicted in FIG. 13, can provide input to VR headset 1385 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 1350 can use the sensors to determine an absolute position and/or a detected rotation of the computing device in the VR space that can then be used as input to the VR space. For example, the computing device 1350 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 1350 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1350 when the computing device is incorporated into the VR space can cause a particular action to occur in the VR space.

In some implementations, a touchscreen of the computing device 1350 can be rendered as a touchpad in VR space. A user can interact with the touchscreen of the computing device 1350. The interactions are rendered, in VR headset 1385 for example, as movements on the rendered touchpad in the VR space. The rendered movements can control objects in the VR space.

In some implementations, one or more output devices included on the computing device 1350 can provide output and/or feedback to a user of the VR headset 1385 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1350 may appear as another object in a computer-generated, 3D environment. Interactions by the user with the computing device 1350 (e.g., rotating, shaking, touching a touchscreen, swiping a finger across a touch screen) can be interpreted as interactions with the object in the VR space. In the example of the laser pointer in a VR space, the computing device 1350 appears as a virtual laser pointer in the computer-generated, 3D environment. As the user manipulates the computing device 1350, the user in the VR space sees movement of the laser pointer. The user receives feedback from interactions with the computing device 1350 in the VR space on the computing device 1350 or on the VR headset 1385.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
   presenting, on a device, a view of at least part of an augmented reality (AR) environment, the AR environment including a first AR location corresponding to a first physical location in a physical environment;
   initiating a download to the device of first data representing a first AR object associated with the first AR location;
   assigning a size parameter to a first loading indicator for the first AR object based on a size of the first AR object;
   determining a spatial relationship between the view and the first physical location, the spatial relationship indicating whether the first physical location is within the view; and
   presenting the first loading indicator in the view, the first loading indicator having a size based on the assigned size parameter and being presented at a second AR location based on the determined spatial relationship.

2. The method of claim 1, wherein the spatial relationship indicates that the first physical location is within the view, the method further comprising selecting the second AR location for presentation of the first loading indicator to coincide with the first AR location in the view.

3. The method of claim 1, wherein the spatial relationship indicates that the first physical location is not within the view, the method further comprising selecting the second AR location for presentation of the first loading indicator to be at a side of the view closest to the first AR location.

4. The method of claim 3, wherein the first loading indicator is smaller than a second loading indicator configured for use when the spatial relationship indicates that the first physical location is within the view.

5. The method of claim 3, wherein the first loading indicator has a two-dimensional appearance and wherein a second loading indicator has a three-dimensional appearance, the second loading indicator configured for use when the spatial relationship indicates that the first physical location is within the view.

6. The method of claim 3, wherein the first loading indicator includes an arrow, and wherein the first loading indicator is positioned so that the arrow points toward the first AR location.

7. The method of claim 1, wherein size information for a second AR object is not available to the device during downloading of second data representing the second AR object, the method further comprising presenting a second loading indicator for the second AR object based on the size information not being available, the second loading indicator different from the first loading indicator.

8. The method of claim 1, wherein a remaining duration of the download of the first data is not available to the device during the download, the method further comprising activating an indeterminate-duration mode of the first loading indicator based on the remaining duration not being available.

9. The method of claim 8, further comprising subsequently determining the remaining duration of the download of the first data, and activating a determinate-duration mode of the first loading indicator based on determining the remaining duration.

10. The method of claim 1, further comprising determining whether a plane in the AR environment that is associated with the first AR location is known, and if so selecting the second AR location for presentation of the first loading indicator to be at the plane.

11. The method of claim 10, wherein if the determination reflects that the plane in the AR environment that is associated with the first AR location is not known, the method further comprises selecting the second AR location for presentation of the first loading indicator based on an AR marker in the AR environment.

12. The method of claim 1, wherein the first data comprises a mesh and a texture configured to be applied to the mesh, the method further comprising determining the size of the first AR object using the mesh.

13. The method of claim 12, further comprising determining a footprint of the first AR object using the mesh, and morphing the first loading indicator into a footprint representation of the first AR object based on the determined footprint.

14. The method of claim 1, wherein the download of the first data is triggered by a user selection in a presented list of AR objects.

15. The method of claim 1, wherein the download of the first data is triggered by a location of the device in the physical environment.

16. The method of claim 1, wherein the download of the first data is triggered by access of a uniform resource locator using the device.

17. The method of claim 1, wherein the download of the first data comprises a peer-to-peer transmission.

18. The method of claim 1, wherein the first data is stored on the device after being downloaded, and wherein the first loading indicator indicates a progress of preparing to present the first AR object using the stored first data.

19. A non-transitory storage medium having stored thereon instructions that when executed are configured to cause a processor to perform operations, the operations comprising:
   presenting, on a device, a view of at least part of an augmented reality (AR) environment, the AR environment including a first AR location corresponding to a first physical location in a physical environment;
   initiating a download to the device of first data representing a first AR object associated with the first AR location;
   assigning a size parameter to a first loading indicator for the first AR object based on a size of the first AR object;
   determining a spatial relationship between the view and the first physical location, the spatial relationship indicating whether the first physical location is within the view; and
   presenting the first loading indicator in the view, the first loading indicator having a size based on the assigned size parameter and being presented at a second AR location based on the determined spatial relationship.

20. The non-transitory storage medium of claim 19, wherein the first loading indicator comprises a peripheral element having a progress indicator, the peripheral element surrounding a transparent center of the first loading indicator.

21. The non-transitory storage medium of claim 19, the operations further comprising determining a status of a download link used for downloading the first data, and assigning a color to the first loading indicator based on the determined status.

22. A non-transitory storage medium having stored thereon instructions that when executed are configured to cause a processor to generate a graphical user interface, the graphical user interface comprising:
   a view including at least part of an augmented reality (AR) environment, the AR environment including a first AR location corresponding to a physical location in a physical environment, wherein an AR object is associated with the first AR location; and
   a loading indicator for the AR object, the loading indicator having a size based on a size of the AR object and being presented at a second AR location in the view based on a spatial relationship between the view and the physical location, the spatial relationship indicating whether the first physical location is within the view.

23. The non-transitory storage medium of claim 22, wherein the spatial relationship indicates that the physical location is within the view, and wherein the second AR location is selected for presentation of the loading indicator to coincide with the first AR location in the view.

24. The non-transitory storage medium of claim 22, wherein the spatial relationship indicates that the physical location is not within the view, and wherein the second AR location is selected for presentation of the loading indicator to be at a side of the view closest to the first AR location.

* * * * *